(12) United States Patent
Ito

(10) Patent No.: US 10,538,681 B2
(45) Date of Patent: *Jan. 21, 2020

(54) AQUEOUS INK FOR INK JET RECORDING

(71) Applicant: Seiko Epson Corporation, Tokyo (JP)

(72) Inventor: Hiroshi Ito, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,162

(22) Filed: Apr. 9, 2018

(65) Prior Publication Data

US 2018/0291220 A1    Oct. 11, 2018

(30) Foreign Application Priority Data

Apr. 10, 2017 (JP) ................. 2017-077359

(51) Int. Cl.
| | | |
|---|---|---|
| *C09D 11/00* | (2014.01) | |
| *C09D 11/38* | (2014.01) | |
| *C09D 11/36* | (2014.01) | |
| *C09D 11/322* | (2014.01) | |
| *C09D 11/033* | (2014.01) | |
| *C09D 11/037* | (2014.01) | |
| *C09D 11/107* | (2014.01) | |
| *B41M 5/00* | (2006.01) | |

(52) U.S. Cl.
CPC ............ *C09D 11/38* (2013.01); *C09D 11/033* (2013.01); *C09D 11/037* (2013.01); *C09D 11/107* (2013.01); *C09D 11/322* (2013.01); *C09D 11/36* (2013.01); *B41M 5/0023* (2013.01)

(58) Field of Classification Search
CPC ..... C09D 11/38; C09D 11/033; C09D 11/037; C09D 11/107; C09D 11/322; C09D 11/36; C09D 11/00; B41M 5/0023
USPC ............................................. 523/160
See application file for complete search history.

(56) References Cited

U.S. PATENT DOCUMENTS

| | | | |
|---|---|---|---|
| 9,878,558 B2 * | 1/2018 | Eguchi .............. | C09D 11/322 |
| 2004/0091642 A1 * | 5/2004 | Murakami .......... | G02B 5/0215 |
| | | | 428/1.31 |
| 2004/0157958 A1 | 8/2004 | Vincent et al. | |
| 2008/0097015 A1 | 4/2008 | Doi et al. | |
| 2011/0152442 A1 | 6/2011 | Doi et al. | |
| 2019/0040272 A1 * | 2/2019 | Ito ..................... | C09D 11/322 |

FOREIGN PATENT DOCUMENTS

| | | |
|---|---|---|
| JP | 2003-128976 A | 5/2003 |
| JP | 2004-204029 A | 7/2004 |
| JP | 2006-520405 A | 9/2006 |
| JP | 2006-282989 A | 10/2006 |
| JP | 2008-163059 A | 7/2008 |
| JP | 2017-141388 A | 8/2017 |
| WO | WO-2004-072134 A1 | 8/2004 |

* cited by examiner

*Primary Examiner* — Hannah J Pak

(74) *Attorney, Agent, or Firm* — Harness, Dickey & Pierce, P.L.C.

(57) ABSTRACT

An aqueous ink for ink jet recording includes a coloring material; an ester-based defoaming agent having a water-octanol distribution coefficient of 2.0 or more and 5.0 or less; an ester-based first solvent having a water-octanol distribution coefficient of −0.5 or more and 2.0 or less; and resin particles having a zeta potential of −65 mV or more and −15 mV or less and including an ester-based reactive surfactant as a constituent unit.

7 Claims, No Drawings

AQUEOUS INK FOR INK JET RECORDING

BACKGROUND

1. Technical Field

The present invention relates to an aqueous ink for ink jet recording.

2. Related Art

In the ink jet recording method, small droplets of ink are ejected from fine nozzles and attached to a recording medium to perform recording. This method has the characteristic of being able to record high resolution and high-quality images at a high speed with a relatively inexpensive apparatus.

In the ink jet recording method, there are an extremely large number of factors to be studied, including the properties of the ink used, the stability in recording, and the quality of images to be obtained, and studies are being carried out not only on the ink jet recording apparatuses but also on the inks to be used.

For example, JP-T-2006-520405 discloses an ink jet ink including latex particles to which a reactive surfactant is covalently bonded and which include a cross-linking agent, with the object of forming a good image on a recording medium by stably ejecting ink droplets.

In addition, JP-A-2003-128976 discloses an aqueous ink including a coloring material/resin composite particles obtained by dispersing a molecular color developer with a reactive dispersing agent and subsequently polymerizing a resin, with the object of improving the coloring property, glossiness, and fixability of the image to be formed and improving the ejection stability of the ink.

Furthermore, JP-A-2006-282989 discloses an aqueous dispersion for ink jet recording including polymer particles, which are emulsion-polymerized in the presence of a reactive surfactant, and a water-insoluble organic compound where a log P value (logarithm of the distribution coefficient of 1-octanol of the organic compound/water) is −1 to 11, with the object of improving printing density and marker resistance.

In the techniques described in JP-T-2006-520405, JP-A-2003-128976, and JP-A-2006-282989 described above, a reactive surfactant or a reactive dispersing agent is used to prepare latex particles, coloring material/resin composite particles, or polymer particles by emulsion polymerization. Such particles have a function of improving the fixability of recorded images. However, a defoaming agent is not added when these latex particles or coloring material/resin composite particles are used to form inks.

Here, in the emulsion polymerization method, since an emulsifier is essential at the time of polymerization and the emulsifier remains in the system after polymerization, the obtained aqueous dispersion has a property of foaming easily. Then, in a case where such an aqueous dispersion is used for ink for ink jet recording which is intermittently ejected (discharged) as liquid droplets, for example, cleaning operations or the like easily cause the ink to foam and it is also difficult to eliminate the generated bubbles. Therefore, minute bubbles are easily taken into the flow path of the recording head or the like, and the ejection property of the ink may deteriorate.

Reducing the amount of emulsifier during the polymerization of the resin particles may be considered as a method for making bubbles less likely to occur. However, when the added amount of the emulsifier is reduced during the emulsion polymerization as described above, the dispersibility of the resin particles is insufficient and it is difficult to obtain storage stability when used in an ink.

In addition, adopting a reactive surfactant able to function as an emulsifier at the time of reaction and incorporating the emulsifier into the particles after polymerization may be considered as a method for making bubbles less likely to occur without reducing the emulsifier. However, in order to reduce the remaining emulsifier, it is necessary to reduce the amount of unreacted (free) reactive surfactant and it is still difficult to obtain a reaction yield (conversion) of 100% in the polymerization of the reactive surfactant.

Under such circumstances, the use of a defoaming agent may be considered as a method for making bubbles less likely to occur and making the generated bubbles easily breakable without reducing the unreacted reactive surfactant and added emulsifier. There are many kinds of defoaming agents and the materials and defoaming mechanisms thereof are diverse. In many cases, defoaming agents have high hydrophobicity and combination with a defoaming agent may destroy the dispersed state of the resin particles dispersed in water and lead to the generation of aggregates. When such a defoaming agent is used, the aggregates become larger than a certain size and clog the recording head or ink flow path, which may cause ejection defects. In addition, depending on the kind thereof, the defoaming agent may be repelled from the printed surface and problems often occur if the defoaming agent is selected without considering the combination with other materials in the ink.

JP-A-2003-128976 describes the use of a defoaming agent, but does not suggest specific materials or combinations thereof and, in ink for ink jet recording in particular, there is a concern that the use of a water-insoluble organic compound having a log P value of approximately −1 to 11 as described in JP-A-2003-128976 as a defoaming agent may aggregate the resin particles and coloring material through combination with other materials in the ink, similarly to highly hydrophobic defoaming agents.

In this manner, even considering only the storage stability and ejection stability of the aqueous ink for ink jet recording, there are an extremely large number of factors to be examined. In addition, there is a need for well-balanced aqueous inks for ink jet recording which also improve the quality of obtained images.

SUMMARY

An advantage of some aspects of the invention is to provide an aqueous ink for ink jet recording which has good storage stability and water resistance on printed matter, and good ejection stability.

The invention can be realized in the following aspects or application examples.

According to an aspect of the invention, there is provided an aqueous ink for ink jet recording, including a coloring material; an ester-based defoaming agent having a water-octanol distribution coefficient of 2.0 or more and 5.0 or less; an ester-based first solvent having a water-octanol distribution coefficient of −0.5 or more and 2.0 or less; and resin particles having a zeta potential of −65 mV or more and −15 mV or less and including an ester-based reactive surfactant as a constituent unit.

Since the aqueous ink for ink jet recording described above includes a defoaming agent having a relatively high hydrophobicity (a water-octanol distribution coefficient (log P) of 2.0 or more and 5.0 or less), and an ester-based first solvent having relatively low hydrophobicity (a water-octanol distribution coefficient of −0.5 or more and 2.0 or less), the solubilization of the defoaming agent is good, bubbles are suppressed, and the ejection stability is good. In addition, in the aqueous ink for ink jet recording, the resin particles have a zeta potential of −65 mV or more and −15 mV or less and include an ester-based reactive surfactant as a constituent unit. Therefore, the aqueous ink for ink jet recording has good dispersion stability due to good affinity with the ester-based first solvent and adequate zeta potential. Due to this, the resin particles do not easily aggregate and the storage stability is good. Furthermore, the aqueous ink for ink jet recording has good fixability and water resistance on recorded matter since at least the ester-based constituent unit is bonded to the resin particles by a covalent bond.

In the aqueous ink for ink jet recording, a content of the first solvent may be 0.5% by mass or more and 15% by mass or less.

It is possible for such an aqueous ink for ink jet recording to further solubilize the defoaming agent, which is more suitable for ink jet recording.

The aqueous ink for ink jet recording may further include a glycol-based second solvent.

According to such an aqueous ink for ink jet recording, in a case where the resin particles include an ester-based reactive surfactant having a polyoxyethylene chain in a constituent unit, it is possible to obtain dispersion stability due to the second solvent having a high affinity for the polyoxyethylene chain. Due to this, the resin particles aggregate less easily and the storage stability is further improved. Furthermore, in this case, the fixability and water resistance on the recorded matter is better since at least the polyoxyethylene chains are bonded to the resin particles by covalent bonds.

In the aqueous ink for ink jet recording, the content of the second solvent may be 2% by mass or more and 30% by mass or less.

Such an aqueous ink for ink jet recording has better storage stability and is more suitable for ink jet recording.

In the aqueous ink for ink jet recording, the second solvent may be selected from ethylene glycol, propylene glycol, 1,3-propanediol, and multimers thereof.

According to such an aqueous ink for ink jet recording, the storage stability is better in a case where the resin particles include an ester-based reactive surfactant having a polyoxyethylene chain as a constituent unit.

In the aqueous ink for ink jet recording, the content of the defoaming agent may be 0.005% by mass or more and 0.5% by mass or less.

Such an aqueous ink for ink jet recording has a better defoaming effect due to the defoaming agent.

In the aqueous ink for ink jet recording, the reactive surfactant may be selected from a sulfate ester, a phosphate ester, and a carboxylate ester.

According to such an aqueous ink for ink jet recording, the affinity with the ester-based first solvent is good and dispersion is stabilized since the resin particles have an ester-based constituent unit. Due to this, for example, even in a case where the aqueous ink for ink jet recording is dried in the vicinity of the nozzles of the recording head, the aqueous ink for ink jet recording does not harden easily and re-ejection by a cleaning operation or the like is easy.

DESCRIPTION OF EXEMPLARY EMBODIMENTS

A description will be given below of several embodiments of the present invention. The embodiments illustrated below illustrate one example of the present invention. The invention is not limited to the following embodiments at all and includes various modifications implemented in a range not departing from the gist of the present invention. Here, not all of the configurations described below are necessarily essential components of the present invention.

1. Aqueous Ink for Ink Jet Recording

The aqueous ink for ink jet recording according to the present embodiment includes a coloring material, a defoaming agent, a first solvent, and resin particles.

1.1. Coloring Material

The aqueous ink for ink jet recording according to the present embodiment includes a coloring material. As the coloring material, it is possible to use either a pigment or a dye, and it is possible to use an inorganic pigment including carbon black, an organic pigment, an oil soluble dye, an acidic dye, a direct dye, a reactive dye, a basic dye, a dispersion dye, or the like. In the aqueous ink for ink jet recording of the present embodiment, the coloring material may be dispersed with a dispersing resin.

As the inorganic pigment, it is possible to use carbon black (C.I. Pigment Black 7) such as furnace black, lamp black, acetylene black, and channel black, iron oxide, titanium oxide, zinc oxide, silica, and the like.

Examples of carbon black include No. 2300, 900, MCF 88, No. 20B, No. 33, No. 40, No. 45, No. 52, MA 7, MA 8, MA 100, No. 2200 B, and the like, manufactured by Mitsubishi Chemical Corp. Examples include Color Black FW 1, FW 2, FW 2V, FW 18, FW 200, S150, S160, S170, Pretex 35, U, V, 140U, Special Black 6, 5, 4A, 4, 250, and the like, manufactured by Degussa. Examples include Conductex SC, Raven 1255, 5750, 5250, 5000, 3500, 1255, 700, and the like, manufactured by Columbia Carbon Co., Ltd. Examples include Regal 400R, 330R, 660R, Mogul L, Monarch 700, 800, 880, 900, 1000, 1100, 1300, 1400, Elftex 12, and the like, manufactured by Cabot Corp.

Examples of organic pigments include quinacridone-based pigments, quinacridone quinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolo pyrrole-based pigments, perinone-based pigments, quinophthalone-based pigments, anthraquinone-based pigments, thio indigo-based pigments, benzimidazolone-based pigments, isoindolinone-based pigments, azomethine-based pigments, azo-based pigments, and the like.

Specific examples of the organic pigment used in the aqueous ink for ink jet recording include the following.

Examples of cyan pigments include C.I. Pigment Blue 1, 2, 3, 15:3, 15:4, 15:34, 16, 22, 60 and the like; C.I. Vat Blue 4, 60, and the like, and preferably mixtures of one kind or two kinds or more selected from the group formed of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202; C.I. Pigment Violet 19 and the like, and preferably mixtures of one kind or two kinds or more selected from C.I. Pigment Red 122, 202, and 209, and C.I. Pigment Violet 19.

Examples of pigments used in yellow aqueous inks for ink jet recording include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably mixtures of one kind or two kinds or more selected from C.I. Pigment Yellow 74, 109, 110, 128, and 138.

Examples of pigments used for orange aqueous inks for ink jet recording include C.I. Pigment Orange 36 or 43, or a mixture thereof. Examples of pigments used for green aqueous inks for ink jet recording include C.I. Pigment Green 7 or 36, or a mixture thereof.

The pigments exemplified above are examples of suitable pigments, and the present invention is not limited thereto. These pigments may be used as one kind or in a mixture of two or more kinds or may be used in combination with a dye.

In addition, the pigment may be used by dispersing the pigment using a dispersing agent selected from a water-soluble resin, a water dispersible resin, and a surfactant, or may be used as a self-dispersing pigment by oxidizing or sulfonating the pigment surface with ozone, hypochlorous acid, fuming sulfuric acid, or the like.

In the aqueous ink for ink jet recording of the present embodiment, in a case where the pigment is dispersed with the dispersing resin, the ratio of the pigment to the dispersing resin is preferably 10:1 to 1:10, and more preferably 4:1 to 1:3. In addition, for the volume average particle size of the pigment at the time of dispersion, in a case of being measured by dynamic light scattering method, the average particle size is 300 nm or less and the maximum particle size is less than 500 nm, and the average particle size is more preferably 200 nm or less.

As the dye, it is possible to use acidic dyes, direct dyes, reactive dyes, and basic dyes as water-soluble dyes, dispersion dyes and oil soluble dyes as water dispersed dyes, or the like.

Examples of acid dyes include C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, and the like.

Examples of direct dyes include C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct black 19, 38, 51, 71, 154, 168, 195, C.I. Direct Blue 2, 3, 8, 10, 12, 31, 35, 63, 116, 130, 149, 199, 230, 231, and the like.

Examples of reactive dyes include C.I. Reactive Yellow 2, 7, 15, 22, 37, 42, 57, 69, 76, 81, 95, 102, 125, 135, C.I. Reactive Red 2, 14, 24, 32, 55, 79, 106, 111, 124, C.I. Reactive Blue 2, 13, 21, 38, 41, 50, 69, 72, 109, 120, 143, C.I. Reactive Black 3, 4, 5, 8, 13, 14, 31, 34, 35, 39, and the like.

Examples of basic dyes include C.I. Basic Yellow 1, 2, 13, 19, 21, 25, 32, 36, 40, 51, C.I. Basic Red 1, 5, 12, 19, 22, 29, 37, 39, 92, C.I. Basic Blue 1, 3, 9, 11, 16, 17, 24, 28, 41, 45, 54, 65, 66, C.I. Basic black 2, 8, and the like.

In addition, as the dispersion dye and the oil soluble dye, it is possible to use any coloring material as long as the coloring material is dispersed but not dissolved in the ink vehicle, and examples thereof include azo-based dyes, metal complex azo-based dyes, anthraquinone-based dyes, phthalocyanine-based dyes, triallyl methane-based dyes, and the like.

Examples of the dispersion dye include C.I. Disperse Red 60, 82, 86, 86:1, 167:1, 279, C.I. Disperse Yellow 64, 71, 86, 114, 153, 233, 245, C.I. Disperse Blue 27, 60, 73, 77, 77:1, 87, 257, 367, C.I. Disperse Violet 26, 33, 36, 57, C.I. Disperse Orange 30, 41, 61, and the like.

Examples of oil-soluble dyes include C.I. Solvent Yellow 16, 21, 25, 29, 33, 51, 56, 82, 88, 89, 150, 163, C.I. Solvent Red 7, 8, 18, 24, 27, 49, 109, 122, 125, 127, 130, 132, 135, 218, 225, 230, C.I. Solvent Blue 14, 25, 35, 38, 48, 67, 68, 70, 132, C.I. Solvent Black 3, 5, 7, 27, 28, 29, 34, and the like.

The dyes exemplified above are examples of suitable coloring materials, and the invention is not limited thereto. These dyes may be used as one kind or as a mixture of two or more kinds, or may be used in combination with a pigment.

It is possible to appropriately adjust the content of the coloring material depending on the application, but the content is preferably 0.10% by mass or more and 20.0% by mass or less, more preferably 0.20% by mass or more and 15.0% by mass or less, and even more preferably 1.0% by mass or more and 10.0% by mass or less.

1.2. Defoaming Agent

The aqueous ink for ink jet recording of the present embodiment includes a defoaming agent. In the present embodiment, the defoaming agent is selected from ester-based compounds having a water-octanol distribution coefficient (log P value) of 2.0 or more and 5.0 or less. From the viewpoint of the balance between the high defoaming effect and the high solubility in the ink, the log P value of the defoaming agent is preferably 2.1 or more and 4.5 or less, and even more preferably 2.3 or more and 4.2 or less.

Here, the water-octanol distribution coefficient, that is, the log P value, is a value defined by OECD Test Guideline 107. The higher the log P value, the higher the hydrophobicity, and the lower the log P value, the higher the hydrophilicity.

One function of the defoaming agent in the present embodiment is to make bubbles less likely to occur in a case where the aqueous ink for ink jet recording is, for example, shaken in the ink container or the recording head. In addition, one of the functions of the defoaming agent is to make bubbles easier to eliminate in a case where bubbles are generated in the aqueous ink for ink jet recording. In the present specification, these functions/actions are sometimes referred to as a defoaming effect. Due to the defoaming effect of the defoaming agent, in a case where the aqueous ink for ink jet recording is used for an ink jet recording apparatus, for example, the flow path of ink such as a recording head is not easily clogged, or It is possible to suppress the pressure loss applied with respect to the aqueous ink for ink jet recording and to increase the ejection stability of the aqueous ink for ink jet recording from the recording head.

As long as the defoaming agent is selected from ester-based compounds having a water-octanol distribution coefficient (log P value) of 2.0 or more and 5.0 or less, there is no limitation thereon, and specific examples thereof include 5-hydroxydodecanoate 2,3-dihydroxypropyl (log P: 2.15), 3-(2-ethylhexyloxy)-1,2-propanediol (log P: 2.53), 3-menthyloxy-1,2-propanediol (log P: 2.60), tributyrin (log P: 2.95), and the like (log P values are indicated in parentheses). In addition, a plurality of kinds of defoaming agent may be mixed and used.

Here, the ester-based compound is a compound including at least one bond (ester bond) resulting from the reaction between an acid and an alcohol. The number of ester bonds of the ester-based compound is not particularly limited.

The blending amount of the defoaming agent is 0.001% by mass or more and 1% by mass or less with respect to the total amount of the aqueous ink for ink jet recording, preferably 0.003% by mass or more and 0.8% by mass or less, and more preferably 0.005% by mass or more and 0.5% by mass or less. When the blending amount of the defoaming agent is within this range, it is possible to sufficiently obtain the defoaming effect in the aqueous ink for ink jet recording.

1.3. First Solvent

The aqueous ink for ink jet recording of the present embodiment contains a first solvent. The first solvent is selected from ester-based compounds having a water-octanol distribution coefficient of −0.5 or more and 2.0 or less. The log P value of the first solvent is more preferably −0.3 or more and 1.9 or less, and even more preferably −0.25 or more and 1.8 or less.

One function of the first solvent is to solubilize the defoaming agent. The defoaming agent described above is an ester-based compound having a log P value of 2.0 or more and 5.0 or less, and has a relatively high hydrophobicity. On the other hand, the first solvent is an ester-based compound having a log P value of −0.5 or more and 2.0 or less, and as indicated by the log P value, the hydrophobicity is lower and the water solubility is higher than the defoaming agent.

In the aqueous ink for ink jet recording of the present embodiment, a defoaming agent which is relatively difficult to dissolve due to a relatively high hydrophobicity is easily dissolved by a first solvent having a relatively low hydrophobicity. That is, the first solvent has a function of making the defoaming agent and water compatible. Therefore, the first solvent also has a function of increasing the amount of the defoaming agent added to the aqueous ink for ink jet recording. Furthermore, in the present embodiment, since the first solvent is an ester-based compound, the affinity with ester groups contained in resin particles (described below) is high, and the first solvent also has a function of suppressing aggregation of the resin particles.

As long as the first solvent is selected from ester-based compounds having a log P value of −0.5 or more and 2.0 or less, there is no limitation thereon, and examples thereof include triacetin (log P: −0.24), 1-butyrine (log P: −0.21), glycerin 1-methacrylate (log P: −0.12), 3-isopentyloxy-1,2 propanediol (log P: 0.64), α-monocaproin (log P: 0.85), 1,3-dibutyrin (log P: 1.59), 2-ethylhexanoate 2,3-dihydroxypropyl (log P: 1.73), and the like (log P values are indicated in parentheses). In addition, a plurality of kinds of the first solvent may be mixed and used.

The blending amount of the first solvent is 0.2% by mass or more and 30% by mass or less with respect to the total amount of the aqueous ink for ink jet recording, preferably 0.4% by mass or more and 20% by mass or less, more preferably 0.5% by mass or more and 15% by mass or less, and even more preferably 0.7% by mass or more and 10% by mass or less. When the blending amount of the first solvent is in this range, it is possible to sufficiently solubilize the defoaming agent, to suppress the aggregation of the resin particles and to make the aqueous ink for ink jet recording more suitable for an ink jet recording apparatus.

1.4. Resin Particles

The aqueous ink for ink jet recording of the present embodiment contains resin particles. The resin particles have a zeta potential of −65 mV or more and −15 mV or less and an ester-based reactive surfactant as a constituent unit. From the viewpoint of the dispersibility of the resin particles (aggregation suppressing property) and the storage stability of the ink accompanying the dispersibility, the zeta potential is more preferably −60 mV or more and −20 mV or less, and even more preferably −55 mV or more and −25 mV or less.

Here, the zeta potential refers to the electrokinetic potential, and is an index showing the potential difference at the interface between the resin particle and the medium. It is possible to find the zeta potential by methods such as electroosmosis or electrophoresis. It is possible to measure the zeta potential, for example, using a commercially available measuring apparatus such as Zetasizer Nano ZS (trade name, manufactured by Malven Instruments Ltd.).

One function of the resin particles is to set (fix) the coloring material on the recording medium. The resin particles are in particle form in the aqueous ink for ink jet recording, due to this, it is possible to suppress the viscosity of the aqueous ink for ink jet recording to be lower than in a case where the fixing resin is blended as a solution.

It is possible for the resin particles to be directly synthesized as a dispersion by emulsion polymerization or suspension polymerization using addition polymerization monomers. The manner of the emulsion polymerization and suspension polymerization is not particularly limited, but it is possible to adopt a method in which all the monomers used for polymerization are mixed to prepare a monomer composition in an emulsified state and this is dropped into the initiator solution, a method in which the monomers used in the polymerization are divided into at least one of a plurality of kinds or amounts to prepare a plurality of monomer compositions in an emulsified state, and this is dropped into the initiator solution, or the like. Due to the polymerization reaction, the monomers are covalently bonded to each other to form a polymer, to obtain the particle form.

As the monomer used for polymerization, it is possible to use acrylic acid esters such as methyl acrylate and ethyl acrylate, methacrylic acid esters such as methyl methacrylate and ethyl methacrylate, and compounds having a carbon-carbon double bond such as vinyl acetate, ethylene, propylene, isobutylene, butadiene, styrene, methylstyrene, vinyl chloride, maleic anhydride, and divinylbenzene.

In addition, the ester group (ester bond) introduced as a result to the resin particles of the present embodiment is introduced by using an ester-based reactive surfactant as a monomer. That is, the ester-based reactive surfactant is a compound including an ester bond and a carbon-carbon double bond, and is incorporated into the constituent unit of the resin particle using the double bond.

In addition, the acid component of the ester bond of the ester-based reactive surfactant is not particularly limited. However, as the acid component, it is more preferable to select at least one kind of sulfuric acid, phosphoric acid, and carboxylic acid. Esters using such acids are sulfate esters, phosphate esters, carboxylate esters and, when these are selected, the affinity with the ester-based first solvent is further improved, and the dispersion of the aqueous ink for ink jet recording is more easily stabilized. Due to this, for example, even in a case where the aqueous ink for ink jet recording is dried in the vicinity of the nozzles of the recording head, the aqueous ink for ink jet recording does not harden easily, and re-ejection by a cleaning operation or the like is easy.

Furthermore, the alcohol (hydroxyl group) component of the ester bond of the ester-based reactive surfactant is not particularly limited, but is more preferably the terminal hydroxyl group of the polyoxyethylene chain. The ester using an alcohol has a polyoxyethylene chain, and in a case where a second glycol-based solvent is used as described below, the affinity with the ester is increased, thus it is possible to further improve the dispersion of the resin particles in the aqueous ink for ink jet recording.

In this manner, in a case where the resin particles have a polyoxyethylene chain and the glycol-based second solvent described below is used with the polyoxyethylene chain, the dispersion is stabilized by the affinity therewith. Due to this, for example, even in a case where the aqueous ink for ink jet recording is dried in the vicinity of the nozzles of the recording head, the aqueous ink for ink jet recording does not harden easily, and re-ejection by a cleaning operation or the like is easy. In addition, after printing, the second solvent penetrates into the recording medium or vaporizes and volatilizes and separates from the resin particles, thus deterioration of the water resistance of the recorded matter is suppressed.

Specific examples of the ester-based reactive surfactant include Aqualon KH (trade name, manufactured by DKS Co., Ltd., sulfate ester type), Aqualon HS (trade name, manufactured by DKS Co., Ltd., sulfate ester type), Aqualon BC (trade name, manufactured by DKS Co., Ltd., sulfate ester type), Adeka Reasoap PP-70 (trade name, manufactured by Adeka Corp.: phosphate ester type), Antox MS-60 (trade name, manufactured by Nippon Nyukazai Co., Ltd., sulfate ester type), Antox EMH-20 (trade name, manufactured by Nippon Nyukazai Co., Ltd., carboxylic acid ester type), Antox LMH-(trade name, manufactured by Nippon Nyukazai Co., Ltd., carboxylic acid ester type), Antox SMH-20 (trade name, manufactured by Nippon Nyukazai Co., Ltd., carboxylic acid ester type), and the like.

In addition, the resin particles of the present embodiment have a zeta potential of −65 mV or more and −15 mV or less, but such a zeta potential indicates that the resin particles are negatively charged.

It is possible to obtain such a zeta potential by adjusting the carboxyl group, sulfonate group, and phosphate group in the molecular structure of the ester-based reactive surfactant.

Here, in a case where a reactive surfactant having both an anionic functional group and an ester bond, such as a polyoxyalkylene alkenyl ether sulfate ester, is used as a monomer, since it is possible to introduce both the ester bond and the anionic functional group to the resin particles with one polymerization, resin particles having a zeta potential of −65 mV or more and −15 mV or less and an ester group are able to be synthesized more easily in some cases.

The polymerization initiator for emulsion polymerization or suspension polymerization is not particularly limited, but water-soluble polymerization initiators such as potassium persulfate, ammonium persulfate, azobisisobutyronitrile, benzoyl peroxide, dibutyl peroxide, and the like are preferable.

Generally, in emulsion polymerization or suspension polymerization, an emulsifier (surfactant) having no reactivity is added in order to emulsify or suspend the monomer. In such a case, after completion of the polymerization reaction, the emulsifier remains in the system in a free state. Often the emulsion or suspension formed due to this has foaming properties.

In contrast, when the reactive surfactant described above is used in emulsion polymerization or suspension polymerization, in addition to being able to carry out emulsification or suspension before polymerization and during polymerization, the compound (reactive surfactant) functioning as an emulsifier is reduced as the polymerization reaction proceeds. Accordingly, when the polymerization reaction is completed, it is possible to sufficiently reduce the amount of the emulsifier (reactive surfactant) remaining in the system in a free state. The emulsion or suspension formed due to this makes it less likely to generate bubbles. The group functioning as an emulsifier is bonded to the resin particles, and even if the amount of the emulsifier (reactive surfactant) remaining in the system is small, the dispersibility of the resin particles is not greatly impaired. Here, even in a case where a reactive surfactant is used as a monomer, it is also possible to carry out polymerization in the presence of a non-reactive surfactant to compensate for the emulsifying power, and, in such a case, it is possible to reduce the amount of a reactive surfactant used. Further, in emulsion polymerization or suspension polymerization, it is also possible to carry out polymerization in the presence of a chain transfer agent, oligomers, and macromers. In addition, it is possible to synthesize the resin particles by emulsion polymerization using plural kinds of monomers, but the resin particles may be synthesized by sequentially conducting polymerization using various monomers alone or a mixture thereof.

When synthesizing the resin particles, the blending amount of the reactive surfactant is 0.5% by mass or more and 5% by mass or less in a case where the total monomers are 100% by mass, preferably 1% by mass or more and 4% by mass or less, more preferably 1.5% by mass to 3% by mass, and even more preferably 2% by mass to 2.5% by mass or less. In addition, even in a case where sequential polymerization is carried out, when synthesizing the resin particles, the blending amount of the reactive surfactant is preferably in the above range in the total of monomers used in each polymerization reaction.

In addition, with respect to the total mass of the aqueous ink for ink jet recording, the blending amount (solid content) of the resin particles in the aqueous ink for ink jet recording is preferably 0.5% by mass or more and 20% by mass or less as the total amount including cases where a plurality of kinds are used, more preferably 1% by mass or more and 15% by mass or less, and even more preferably 5% by mass or more and 15% by mass or less. The content of the resin particles being 0.5% by mass or more further improves the adhesiveness of the aqueous ink for ink jet recording to the recording medium. In addition, the content of the resin particles being 20% by mass or less tends to make the ejection property from the recording head of the aqueous ink for ink jet recording favorable.

In addition, the volume average particle size of the resin particles of the present embodiment is 100 nm or more and 500 nm or less, preferably 150 nm or more and 400 nm or less, and more preferably 200 nm or more and 300 nm or less. It is possible to appropriately set the particle size, for example, according to various conditions (stirring conditions, temperature, and the like) during emulsion polymerization. It is possible to measure the volume average particle size of the resin particles by, for example, a particle size distribution measuring apparatus using the laser diffraction scattering method as the measurement principle. Examples of particle size distribution measuring apparatuses include a particle size distribution meter (for example, "Microtrac UPA" manufactured by Nikkiso Co., Ltd.) with the dynamic light scattering method as the measurement principle.

1.6. Water

The aqueous ink for ink jet recording according to the present embodiment contains water. Examples of the water include water obtained by removing ionic impurities as much as possible such as pure water and ultrapure water such as ion exchanged water, ultra-filtered water, reverse osmosis water, and distilled water. In addition, when water sterilized by ultraviolet irradiation, addition of hydrogen peroxide, or the like is used, it is possible to prevent the generation of bacteria and fungi in a case of long-term storage of the aqueous ink for ink jet recording.

The content of water is 30% by mass or more with respect to the total amount of the aqueous ink for ink jet recording, preferably 40% by mass or more, more preferably 45% by mass or more, and even more preferably 50% by mass or more. Examples of the water in the aqueous ink for ink jet recording include water to which a pigment dispersion used as a raw material and a resin particle dispersion are added. The content of water being 30% by mass or more makes it possible to obtain an aqueous ink for ink jet recording relatively low in viscosity. In addition, the upper limit of the content of water is preferably 90% by mass or less with respect to the total amount of the aqueous ink for ink jet recording, more preferably 85% by mass or less, and even more preferably 80% by mass or less. Here, a case of referring to "aqueous ink" in the present specification refers to an ink containing water in an amount of 30% by mass or more with respect to the total mass (100% by mass) of the ink.

1.7. Other Components

The aqueous ink for ink jet recording of the present embodiment may contain components such as a moisturizer, a surface tension adjusting agent, and a pH adjusting agent.

1.7.1. Second Solvent

The aqueous ink for ink jet recording of the present embodiment may further include a second solvent. The second solvent is a glycol-based compound. The log P value of the second solvent is not limited. The second solvent is a glycol-based compound, and more preferably a compound having a log P value of less than 0.02 from the viewpoint of solubility in water.

One of the functions of the second solvent is to make the first solvent and water compatible with each other. In addition, in the aqueous ink for ink jet recording of the present embodiment, including the second solvent makes it possible to increase the blending amount of the first solvent, and it is also possible to increase the blending amount of the defoaming agent in some cases.

Specific examples of the second solvent include glycols such as ethylene glycol, diethylene glycol, triethylene glycol, polyethylene glycol, propylene glycol, dipropylene glycol, polypropylene glycol, polyoxyethylene polyoxypropylene glycol, 1,3-propanediol, 1,2-butanediol, 1,2-pentanediol, 1,4-butanediol, 1,5-pentanediol, and 1,6-hexanediol. Among these, the second solvent is more preferably selected from ethylene glycol, propylene glycol, 1,3-propanediol and multimers thereof (for example, diethylene glycol, triethylene glycol, polyethylene glycol, dipropylene glycol, polypropylene glycol, polyoxyethylene polyoxypropylene glycol, and the like). One kind of the second solvent may be used alone, or two or more kinds may be used in combination.

The blending amount of the second solvent is 0.5% by mass or more to 50% by mass or less with respect to the total amount of the aqueous ink for ink jet recording, preferably 1% by mass or more to 40% by mass or less, more preferably 2% by mass or more to 30% by mass or less, and even more preferably 3% by mass or more and 25% by mass or less. When the blending amount of the second solvent is within this range, it is possible for the solubility of the first solvent to be increased and, due to this, it is possible to more sufficiently solubilize the defoaming agent and to suppress aggregation of the resin particles.

1.7.2. Moisturizer

The aqueous ink for ink jet recording of the present embodiment may contain a moisturizer. The moisturizer is not particularly limited and is able to be used as long as the moisturizer may be generally used for an aqueous ink for ink jet recording. The boiling point of the moisturizer is preferably 180° C. or higher, and more preferably 200° C. or higher. The boiling point being within the above range makes it possible to impart good water retention and wettability to the aqueous ink for ink jet recording.

Specific examples of the moisturizer include polyols having three or more hydroxyl groups such as glycerin, diglycerin, mesoerythritol, trimethylolpropane, pentaerythritol, and dipentaerythritol, lactams such as 2-pyrrolidone, N-methyl-2-pyrrolidone, ε-caprolactams, and hydroxyethyl pyrrolidone, urea derivatives such as urea, thiourea, ethylene urea, and 1,3-dimethyl imidazolidinones, monosaccharides, disaccharides, oligosaccharides, polysaccharides, and derivatives of these saccharides such as glucose, mannose, fructose, ribose, xylose, arabinose, galactose, aldonic acid, glucitol (Sorbitol), maltose, cellobiose, lactose, sucrose, trehalose, and maltotriose, betaines of glycine and trimethylglycine, and the like.

Here, among the moisturizers exemplified above, polyols (glycol-based compounds) which are different from the first solvent described above are classified as second solvents.

In a case where a moisturizing agent is blended in the aqueous ink for ink jet recording of the present embodiment, the blending amount is 0.2% by mass or more and 30% by mass or less with respect to the total amount of the aqueous ink for ink jet recording, preferably 0.4% by mass or more and 20% by mass or less, more preferably 0.5% by mass or more and 15% by mass or less, and even more preferably 0.7% by mass or more and 10% by mass or less.

1.7.3. Surface Tension Adjusting Agent

The aqueous ink for ink jet recording of the present embodiment may contain a surface tension adjusting agent. The surface tension adjusting agent is selected from low surface tension water-soluble solvents and surfactants used for lowering the surface tension at the time of dissolution in water and to adjust the wettability of the ink with respect to the printing base material and the ejection flow path. Examples of the water-soluble solvent base include lower alcohols such as ethanol, propanol, and butanol, diols such as butylene glycol, 1,3-pentanediol, 2-ethyl-1,3-propanediol, and 1,6-hexanediol, glycol monoethers such as ethylene glycol monomethyl ether, ethylene glycol monoethyl ether, diethylene glycol monomethyl ether, diethylene glycol monoethyl ether, and propylene glycol monomethyl ether.

Here, among the water-soluble solvent-based surface tension adjusting agent exemplified above, diols (glycol-based compounds) or glycol monoethers (glycol ether-based compounds) having a log P value of −0.5 or more and 2.0 or less are classified as the first solvent, and diols (glycol-based compounds) are classified as the second solvent when different from the first solvent described above.

It is possible to appropriately select the surfactant base from, for example, a nonionic-based surfactant, an anionic-based surfactant, a cationic-based surfactant, and an amphoteric surfactant. Among these, an acetylene glycol-based surfactant and a silicone-based surfactant having high surface activity and a small bubbling property are more preferable.

Examples of the acetylene glycol-based surfactant are not particularly limited, but examples thereof include Olfine E1004, E1010, E1020, PD-001, PD-002W, PD-004, PD-005, EXP. 4200, EXP. 4123, and EXP. 4300 (the above are trade names, manufactured by Nissin Chemical Co., Ltd.), Surfynol 440, 465, 485, CT 111, CT 121, TG, GA, Dynol 604, and 607 (the above are trade names, manufactured by Air Products Japan, Inc.), Acrytylenol E40, E60, E100 (the above are trade names, manufactured by Kawaken Fine Chemicals Co., Ltd.), E series such as Olfine 104 series and Olfine E1010 (the above are trade names, manufactured by Air Products Japan, Inc.), Surfynol 465 (the above are trade names, manufactured by Nissin Chemical Industry Co., Ltd.), and the like.

Examples of the silicone-based surfactant include a polysiloxane-based compound, a polyether modified organosiloxane, and the like. Commercially available silicone-based surfactants are not particularly limited and specific examples thereof include BYK-306, BYK-307, BYK-333, BYK-341, BYK-345, BYK-346, BYK-347, BYK-348, and BYK-349

(the above are trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, and KF-6012 (the above are trade names, manufactured by Shin-Etsu Chemical Co., Ltd.), Silface SAG 002, 005, 503A, and 008 (the above are trade names, manufactured by Nisshin Chemical Industry Co., Ltd.), and the like.

1.7.4. pH Adjusting Agent

It is possible to add a pH adjusting agent to the aqueous ink for ink jet recording of the present embodiment for the purpose of adjusting the pH thereof. The pH adjusting agent is not particularly limited, but examples thereof include inorganic acids such as sulfuric acid, hydrochloric acid, and nitric acid, inorganic bases such as lithium hydroxide, sodium hydroxide, potassium hydroxide, and ammonia, organic bases such as triethanolamine, diethanolamine, monoethanolamine, triisopropanolamine, diisopropanolamine, and trishydroxymethylaminomethane, organic acids such as adipic acid, citric acid, succinic acid, and lactic acid.

1.7.5. Other Components

It is possible to appropriately add various additives to the aqueous ink for ink jet recording according to the present embodiment, such as a preservative, a dissolution aid, a viscosity adjusting agent, an antioxidant, a mildewproofing agent, and a chelating agent for capturing metal ions affecting dispersion for maintaining satisfactory storage stability of the ink and ejection stability from the head, for improving the clogging, or for preventing deterioration of the aqueous ink for ink jet recording.

1.8. Functional Effect

Since the aqueous ink for ink jet recording according to the present embodiment includes a defoaming agent having a relatively high hydrophobicity (a water-octanol distribution coefficient (log P) of 2.0 or more and 5.0 or less), and a first solvent selected from ester-based compounds having relatively low hydrophobicity (a water-octanol distribution coefficient of −0.5 or more and 2.0 or less), the solubilization of the defoaming agent is good, bubbles are suppressed, and the ejection stability is good. In addition, in the aqueous ink for ink jet recording of the present embodiment, the zeta potential of the resin particle is −65 mV or more and −15 mV or less. Therefore, dispersion stability is obtained due to the zeta potential and, due to this, the resin particles are less likely to aggregate and the storage stability is good.

2. Ink Jet Recording Apparatus

It is possible to suitably use the aqueous ink for ink jet recording of the present embodiment for an ink jet recording apparatus. The ink jet recording apparatus is not particularly limited as long as the apparatus has at least an ink storage container (cartridge, tank, or the like) for storing the aqueous ink for ink jet recording described above and a recording head connected thereto and is able to form an image on a recording medium by ejecting the aqueous ink for ink jet recording described above from the recording head.

As the ink jet recording apparatus of the present embodiment, it is possible to use either a serial type or a line type apparatus. In these types of ink jet recording apparatus, a recording head is mounted, and it is possible to form a predetermined image by ejecting droplets of aqueous ink for ink jet recording from the nozzle holes of the recording head at a predetermined timing (intermittently) and with a predetermined volume (mass) while changing the relative positional relationship between the recording medium and the recording head and attaching the aqueous ink for ink jet recording to the recording medium.

In general, in a serial-type ink jet recording apparatus, the transport direction of the recording medium and the direction in which the recording head reciprocates intersect each other and the reciprocating operation of the recording head and the transport operation (also including the reciprocation operation) of the recording medium combine to change the relative positional relationship between the recording medium and the recording head. In this case, in general, a plurality of nozzle holes (holes for ejecting aqueous ink for ink jet recording) are arranged in the recording head, and a row (nozzle row) of nozzle holes is formed in the transport direction of the recording medium. In addition, a plurality of nozzle rows may also be formed in the recording head according to the kind and number of aqueous inks for ink jet recording.

In addition, generally, in a line type ink jet recording apparatus, the recording head does not perform a reciprocating operation and the relative positional relationship between the recording medium and the recording head changes according to the transportation of the recording medium. In this case as well, in general, a plurality of nozzle holes are arranged in the recording head, and a row (nozzle row) of the nozzle holes is formed in a direction intersecting the transport direction of the recording medium.

The ink jet recording method uses a serial type or line type ink jet recording apparatus as described above and there is no particular limitation on the method as long as it is possible to eject aqueous ink for ink jet recording as liquid droplets from fine nozzle holes and attach the liquid droplets to the recording medium. For example, examples of an ink jet recording method include an electrostatic suction method, a method in which ink droplets are discharged by pump pressure, a method using a piezoelectric element, a method in which an ink liquid is heated and foamed with a microelectrode to discharge the ink droplets, and the like.

For the ink jet recording apparatus used in the present embodiment, for example, it is possible to adopt well-known configurations such as a heating unit, a drying unit, a roll unit, a winding apparatus, or the like without limitation.

In the configuration in which the ink jet recording apparatus has a heating unit, the heating unit is able to heat at least one of the recording medium or the aqueous ink for ink jet recording (image) on the recording medium in the recording head in at least one of during the image forming or after the image forming. Due to this, it is possible to promptly evaporate the liquid medium (specifically, water, alkyl polyol, glycol ether, and the like) contained in the aqueous ink for ink jet recording attached on the recording medium. Due to this, it is possible to obtain high-quality images on the recording medium in a short time. In addition, as the heating unit, the aqueous ink for ink jet recording in the recording head may be heated for the purpose of lowering the viscosity of the aqueous ink for ink jet recording. Due to this, there may be a configuration in which the viscosity of the aqueous ink for ink jet recording is reduced to improve the ejection property. As a specific heating means, forced air heating, radiation heating, conductive heating, high frequency drying, microwave drying, and the like are preferably used.

It is possible to suitably use the aqueous ink for ink jet recording of the present embodiment for an ink jet recording apparatus, but, in particular, the aqueous ink for ink jet recording exhibits an extremely excellent effect in an ink jet recording apparatus including a heating unit (heating drying method).

That is, in a case where the ink jet recording apparatus includes a heating unit, the aqueous ink for ink jet recording in the vicinity of the nozzle hole of the recording head may also be dried by heating the recording head or the recording medium. Then, the aqueous ink for ink jet recording normally becomes highly viscous or solidified due to aggregation of the resin or the like and clogs the nozzle hole.

In contrast, in the aqueous ink for ink jet recording of the above embodiment, the zeta potential of the resin particles is −65 mV or more and −15 mV or less. Therefore, in a state where the moisture content is high, it is possible to stabilize the dispersibility of the resin particles mainly due to the effect of the zeta potential in the specific range. In addition, in a state where the moisture is dried and the concentration of the solvent is increased, in a case where the second solvent is contained, it is possible to stabilize the dispersibility of the resin particles and, due to this, even if the drying proceeds to some extent, aggregation of the resin hardly occurs and re-ejection of the aqueous ink for ink jet recording from the nozzle hole is easy. In this case, after printing, the second solvent penetrates into the recording medium or vaporizes and volatilizes and separates from the resin particles, thus, the water resistance and fixability of the recorded matter are sufficiently secured.

3. Examples and Comparative Examples

A more detailed description will be given of the invention with reference to examples, but the invention is not limited to these examples.

3.1. Preparation of Resin Particle Dispersion 3.1.1. Resin Particle Dispersion 1

50 g of methyl methacrylate and 100 g of 2-ethylhexyl methacrylate as a monomer, 3.5 g of Aqualon KH (trade name, manufactured by DKS Co., Ltd.) as a sulfate ester type reactive surfactant, and 100 g of ion-exchanged water were mixed with a homomixer to prepare a monomer emulsion 1.

100 g of methyl methacrylate as a monomer, 50 g of 2-ethylhexyl methacrylate, 1 g of methacrylic acid, 3.5 g of Aqualon KH (trade name, manufactured by DKS Co., Ltd.), and 100 g of ion-exchanged water were mixed with a homomixer to prepare a monomer emulsion 2.

An initiator solution was prepared by dissolving 0.5 g of ammonium persulfate as a polymerization initiator in 20 g of ion exchanged water.

Next, 150 g of ion exchanged water, 0.2 g of sodium hydrogencarbonate, and 50 g of monomer emulsion 1 were added to a reactor provided with a stirrer, a reflux condenser, a thermometer, a nitrogen inlet tube, and three dropping funnels, and the mixture was stirred at 80° C. for 30 minutes while bubbling with nitrogen. Subsequently, the initiator solution was added from the dropping funnel over 15 minutes, the entire remaining amount of the monomer emulsion 1 was further added from the dropping funnel over 1.5 hours, and then the entire amount of the monomer emulsion 2 was added from the dropping funnel over two hours to carry out polymerization. After aging for 3 hours, the mixture was cooled and the pH was adjusted to 7.5 through aqueous ammonia and the addition of ion exchanged water to prepare a resin particle dispersion 1 having a solid content concentration of 40%.

The particle size of the obtained resin particles was measured using Microtrac UPA (manufactured by Nikkiso Co., Ltd.) and was 250 nm. In addition, the resin particles were diluted with water so as to be 0.1 wt %, and the zeta potential was measured with a Zetasizer Nano ZS (trade name, manufactured by Malvern Instruments Ltd.) and, as a result, was −50 mV. Furthermore, qualitative analysis of the polyoxyethylene chain was carried out using a chemical decomposition gas chromatography method.

3.1.2. Resin Particle Dispersions 2 and 3

Resin particle dispersions 2 and 3 were prepared in the same manner as in the preparation of resin particle dispersion 1 described above except that the amounts and kinds of the reactive surfactant and the polymerization initiator were changed as shown in Table 1. The zeta potentials of each of the resin particles were −40 mV and −55 mV, respectively, and these are shown in Table 1.

TABLE 1

| | | Resin Particle Dispersion No. | | |
|---|---|---|---|---|
| | | 1 | 2 | 3 |
| Monomer emulsion 1 | Methyl methacrylate | 50 g | 50 g | 50 g |
| | 2-ethylhexyl methacrylate | 100 g | 100 g | 100 g |
| | Reactive surfactant Aqualon KH | 3.5 g | — | — |
| | Reactive surfactant Adeka Reasoap PP-70 | — | 3.5 g | — |
| | Reactive surfactant Antox SMH-20 | — | — | 3.5 g |
| | Ion exchanged water | 100 g | 100 g | 100 g |
| Monomer emulsion 2 | Methyl methacrylate | 100 g | 100 g | 100 g |
| | 2-ethylhexyl methacrylate | 50 g | 50 g | 50 g |
| | Methacrylate | 1 g | 1 g | 1 g |
| | Reactive surfactant Aqualon KH | 3.5 g | — | — |
| | Reactive surfactant Adeka Reasoap PP-70 | — | 3.5 g | — |
| | Reactive surfactant Antox SMH-20 | — | — | 3.5 g |
| | Ion exchanged water | 100 g | — | — |
| Polymerization initiator | Ammonium persulfate | 0.5 g | 0.8 g | — |
| | Azobisisobutyronitrile | — | — | 0.5 g |
| | Zeta potential (mV) | −50 | −40 | −55 |

3.2. Preparation of Ink 1020 g of a cyan pigment dispersion (pigment concentration: 15% by mass) prepared separately, 0.2 g of Surfynol DF 110 D (trade name, manufactured by Air Products Japan KK) (2,5,8,11-tetramethyl-6-dodecyne-5,8-diol) (log P=4.18) (acetylene glycol-based) as a defoaming agent, 5 g of 1,2-hexanediol (log P=0.7) as a first solvent, 5 g of polyethylene glycol 200 as a second solvent, 25 g of resin particle dispersion 1, 15 g of glycerin as a moisturizer, 0.5 g of Silface SAG 503 A (trade name, manufactured by Nisshin Chemical Industry Co., Ltd.) as a surface tension adjusting agent, and 0.4 g of triisopropanolamine as a pH adjusting agent were mixed, ion exchanged water was added thereto to make the total amount 100 g, and the mixture was thoroughly stirred. Thereafter, filtration was performed with a membrane filter having a pore diameter of 1.2 μm to prepare the ink of Example 1.

The kinds and amounts of the defoaming agent, the first solvent, the second solvent, the resin particle dispersion, the moisturizing agent, and the surface tension adjusting agent were changed as shown in Table 2, and the inks of Examples 2 and 3 and inks of Comparative Examples 1 and 2 were respectively created in the same manner as described above.

TABLE 2

| Ink Composition Added Amount (g) | | Example 1 | Example 2 | Example 3 | Comparative Example 1 | Comparative Example 2 |
|---|---|---|---|---|---|---|
| Coloring material | Cyan pigment dispersion | 20 | 20 | 20 | 20 | 20 |
| Defoaming agent | 3-methyloxy-1,2-propanediol | 0.2 | — | — | 0.2 | — |
| | Tributyrin | — | 0.2 | — | — | — |
| | 5-hydroxydodecanoate 2,3-dihydroxypropyl | — | — | 0.4 | — | — |
| | KS-66 | — | — | — | — | 0.2 |
| First solvent | 3-isopentyloxy-1,2-propanediol | 5 | — | — | — | 5 |
| | 1-butyrin | — | 5 | — | — | — |
| | Triacetin | — | — | 5 | — | — |
| Second solvent | Polyethylene glycol 200 | 5 | 5 | 2 | 10 | 5 |
| | 1,3-propane diol | — | 5 | 3 | — | — |
| Resin | Resin particle dispersion 1 | 25 | — | — | 25 | 25 |
| | Resin particle dispersion 2 | — | 25 | — | — | — |
| | Resin particle dispersion 3 | — | — | 25 | — | — |
| Moisturizer | Glycerin | 15 | — | 15 | 15 | 15 |
| | Trimethylolpropane | — | 15 | — | — | — |
| Surface tension adjusting agent | Silface SAG503A | 0.5 | 0.5 | — | 0.5 | 0.5 |
| | BYK-348 | — | — | 0.5 | — | — |
| pH adjusting agent | Triisopropanolamine | 0.4 | 0.4 | 0.4 | 0.4 | 0.4 |
| | Ion exchanged water | Remainder | Remainder | Remainder | Remainder | Remainder |
| Evaluation results | Storage stability | A | A | A | C | C |
| | Defoaming property | A | A | A | A | A |
| | Ejection stability | A | A | A | C | C |

In Table 2, "KS-66" is a silicone-based defoaming agent and was obtained from Shin-Etsu Chemical Co., Ltd. "BYK-348" is a surface tension adjusting agent and was obtained from BYK Japan KK. In addition, in the defoaming agent, the water-octanol distribution coefficient (log P) of 3-menthyloxy-1,2-propanediol is 2.60, the log P of tributyrin is 2.95, the log P of 5-hydroxydodecanoic acid 2,3-dihydroxypropyl is 2.15, the log P of 3-isopentyloxy-1,2-propane diol in the first solvent is 0.64, the log P of 1-butyrin is −0.21, and the log P of triacetin is −0.24.

3.3. Evaluation of Ink 3.3.1. Storage Stability

Each of the inks of Examples and Comparative Examples was placed in a sample bottle and stored at two levels of 60° C. and −20° C. for one week, after which each ink was filtered and a precipitate was collected. The storage stability was evaluated according to the number and appearance of all the precipitates at the two levels. Evaluation criteria are shown below.

A: Less than 50 particles/1 mL of precipitate
B: 50 particles/1 mL or more and less than 200 particles/1 mL of precipitate
C: 200 particles/1 mL or more of precipitate
D: The ink was split 3.3.2. Defoaming Property Each ink of the Examples and Comparative Examples was placed in a sample bottle up to ¹⁄₁₀ the height of the sample bottle, stirred for 1 minute, left to stand as it was, and then the defoaming property was evaluated according to the height of the foam remaining after 10 minutes. The evaluation criteria are shown below.

A: Less than 10% of the ink height
B: 10% or more and less than 100% of the ink height
C: 100% or more and less than 500% of the ink height
D: 500% or more of the ink height 3.3.3. Ejection Stability Each ink of Example and Comparative Example was filled in an ink jet type printer EM-930C (trade name, manufactured by Seiko Epson Corp.) and, immediately after repeating the cleaning three times, continuous printing was performed on 20 pages while ejecting from all of the nozzles, and the number of print omissions and bent nozzles was determined based on the following criteria.

A: 0 omissions or bent nozzles
B: 1 to 5 omissions or bent nozzles
C: More than 6 omissions or bent nozzles 3.4. Evaluation Results The evaluation results above are listed in Table 2. Looking at the evaluation results, it was found that inks of each of the Examples including a defoaming agent selected from ester-based compounds having a water-octanol distribution coefficient of 2.0 or more and 5.0 or less, a first solvent selected from an ester-based compound having a water-octanol distribution coefficient of −0.5 or more and 2.0 or less, resin particles having a zeta potential of −65 mV or more and −15 mV or less and including an ester-based reactive surfactant as a constituent unit had extremely good results for all of the storage stability, the defoaming property, and the ejection stability. The results confirmed at least that the defoaming agent is sufficiently solubilized by the first solvent, that no aggregation of the resin particles occurs, and that a sufficient defoaming property and ejection stability due to this are obtained.

On the other hand, in the ink of Comparative Example 1 including no first solvent, the results for the storage stability and ejection stability were insufficient. This may be presumed to be the result of aggregation of the defoaming agent due to insufficient solubilization of the defoaming agent.

In addition, in Comparative Example 2 in which the defoaming agent was a silicone-based compound, the storage stability and ejection stability were insufficient. This is considered to be due to the fact that it was not possible to sufficiently solubilize the silicone-based defoaming agent using both the ester-based first solvent and the glycol-based second solvent.

The invention is not limited to the embodiments described above and various modifications are possible. For example, the invention includes configurations substantially the same as the configuration described in the embodiment (for example, a configuration having the same function, method, and result, or a configuration having the same object and effect). In addition, the invention includes configurations in which non-essential parts of the configuration described in the embodiment are replaced. In addition, the invention includes configurations achieving the same operation and effect as the configuration described in the embodiment, or configurations which are able to achieve the same object. In addition, the invention includes a configuration in which a known technique is added to the configuration described in the embodiment.

The entire disclosure of Japanese Patent Application No. 2017-077359, filed Apr. 10, 2017 is expressly incorporated by reference herein.

What is claimed is:

1. An aqueous ink for ink jet recording, comprising:
   a coloring material;
   an ester-based defoaming agent having a water-octanol distribution coefficient of 2.0 or more and 5.0 or less;
   an ester-based first solvent having a water-octanol distribution coefficient of −0.5 or more and 2.0 or less; and
   resin particles having a zeta potential of −65 mV or more and −15 mV or less and including an ester-based reactive surfactant as a constituent unit.

2. The aqueous ink for ink jet recording according to claim 1, wherein a content of the first solvent is 0.5% by mass or more and 15% by mass or less.

3. The aqueous ink for ink jet recording according to claim 1, further comprising:
   a glycol-based second solvent.

4. The aqueous ink for ink jet recording according to claim 3,
   wherein a content of the second solvent is 2% by mass or more and 30% by mass or less.

5. The aqueous ink for ink jet recording according to claim 3,
   wherein the second solvent is selected from the group consisting of ethylene glycol, propylene glycol, 1,3-propanediol, and a multimer thereof.

6. The aqueous ink for ink jet recording according to claim 1,
   wherein a content of the defoaming agent is 0.005% by mass or more and 0.5% by mass or less.

7. The aqueous ink for ink jet recording according to claim 1,
   wherein the reactive surfactant is selected from the group consisting of a sulfate ester, a phosphate ester, and a carboxylate ester.

\* \* \* \* \*